United States Patent
Williams et al.

(10) Patent No.: US 6,817,551 B2
(45) Date of Patent: Nov. 16, 2004

(54) CONVERTIBLE PLURAL BIN AND CONVEYOR MATERIAL SPREADER

(75) Inventors: John Williams, Princeton, IL (US); Gerald Brechon, Dixon, IL (US)

(73) Assignee: Highway Equipment Company, Cedar Rapids, IA (US)

( * ) Notice: Subject to any disclaimer, the term of this patent is extended or adjusted under 35 U.S.C. 154(b) by 264 days.

(21) Appl. No.: 10/063,340

(22) Filed: Apr. 12, 2002

(65) Prior Publication Data

US 2004/0026544 A1 Feb. 12, 2004

(51) Int. Cl.$^7$ ................................................ A01C 7/06
(52) U.S. Cl. .................. 239/656; 239/657; 239/675; 222/135; 222/545
(58) Field of Search .............................. 239/656, 657, 239/663, 672, 675, 676; 222/135, 138, 545, 610, 626; 291/33

(56) References Cited

U.S. PATENT DOCUMENTS

| | | |
|---|---|---|
| 3,073,606 A | 1/1963 | Hurt |
| 3,101,175 A | 8/1963 | Brown |
| 3,143,295 A | 8/1964 | Booker |
| 3,330,070 A | 7/1967 | Ferm et al. |
| 3,468,379 A | 9/1969 | Rushing et al. |
| 3,511,411 A | 5/1970 | Weiss |
| 3,677,540 A | 7/1972 | Weiss |
| 3,770,198 A | 11/1973 | Mihara |
| 3,785,564 A | 1/1974 | Baldocchi |
| 3,855,953 A | 12/1974 | Fathauer et al. |
| 3,945,332 A | 3/1976 | Wirsbinski |
| 4,014,271 A | 3/1977 | Rohlf et al. |
| 4,052,003 A | 10/1977 | Steffen |
| 4,116,138 A | 9/1978 | McFarland et al. |
| 4,162,766 A | * 7/1979 | Ten Broeck et al. ........ 239/656 |
| 4,226,366 A | 10/1980 | Nortoft |
| 4,230,280 A | 10/1980 | Leigh et al. |
| 4,277,022 A | 7/1981 | Holdsworth et al. |
| 4,296,695 A | 10/1981 | Quanbeck |
| 4,350,293 A | 9/1982 | Lestradet |
| 4,358,054 A | 11/1982 | Ehrat |
| 4,376,298 A | 3/1983 | Sokol et al. |
| 4,422,562 A | 12/1983 | Rawson |
| 4,561,594 A | 12/1985 | Kampman |
| 4,588,127 A | 5/1986 | Ehrat |
| 4,630,773 A | 12/1986 | Ortlip |
| 4,714,196 A | 12/1987 | McEachern et al. |
| 4,723,710 A | 2/1988 | Lucore, II |
| 4,790,484 A | 12/1988 | Wall |
| 4,798,325 A | 1/1989 | Block |
| 4,852,809 A | 8/1989 | Davis et al. |
| 4,878,614 A | 11/1989 | Hach et al. |
| 4,886,208 A | 12/1989 | Strand |
| 4,895,303 A | 1/1990 | Freyvogel |
| 5,014,914 A | 5/1991 | Wallenas |
| 5,028,009 A | 7/1991 | Takata |
| 5,033,397 A | 7/1991 | Colburn, Jr. |
| 5,050,771 A | 9/1991 | Hanson et al. |
| 5,052,627 A | 10/1991 | Balmer |
| 5,076,704 A | 12/1991 | Serbousek |
| RE35,100 E | 11/1995 | Monson et al. |
| 5,950,933 A | 9/1999 | Balmer |
| 6,092,966 A | 7/2000 | Martin et al. |
| 6,347,216 B1 | 2/2002 | Marko et al. |

\* cited by examiner

Primary Examiner—Michael Mar
Assistant Examiner—Thach H. Bui
(74) Attorney, Agent, or Firm—Simmons, Perrine, Albright & Ellwood, PLC

(57) ABSTRACT

A convertible material spreader in which a single hopper bin with a conveyor is converted into a dual bin hopper with dual independent conveyors by nesting a secondary hopper and conveyor combination into the primary bin after removing an end gate.

44 Claims, 16 Drawing Sheets

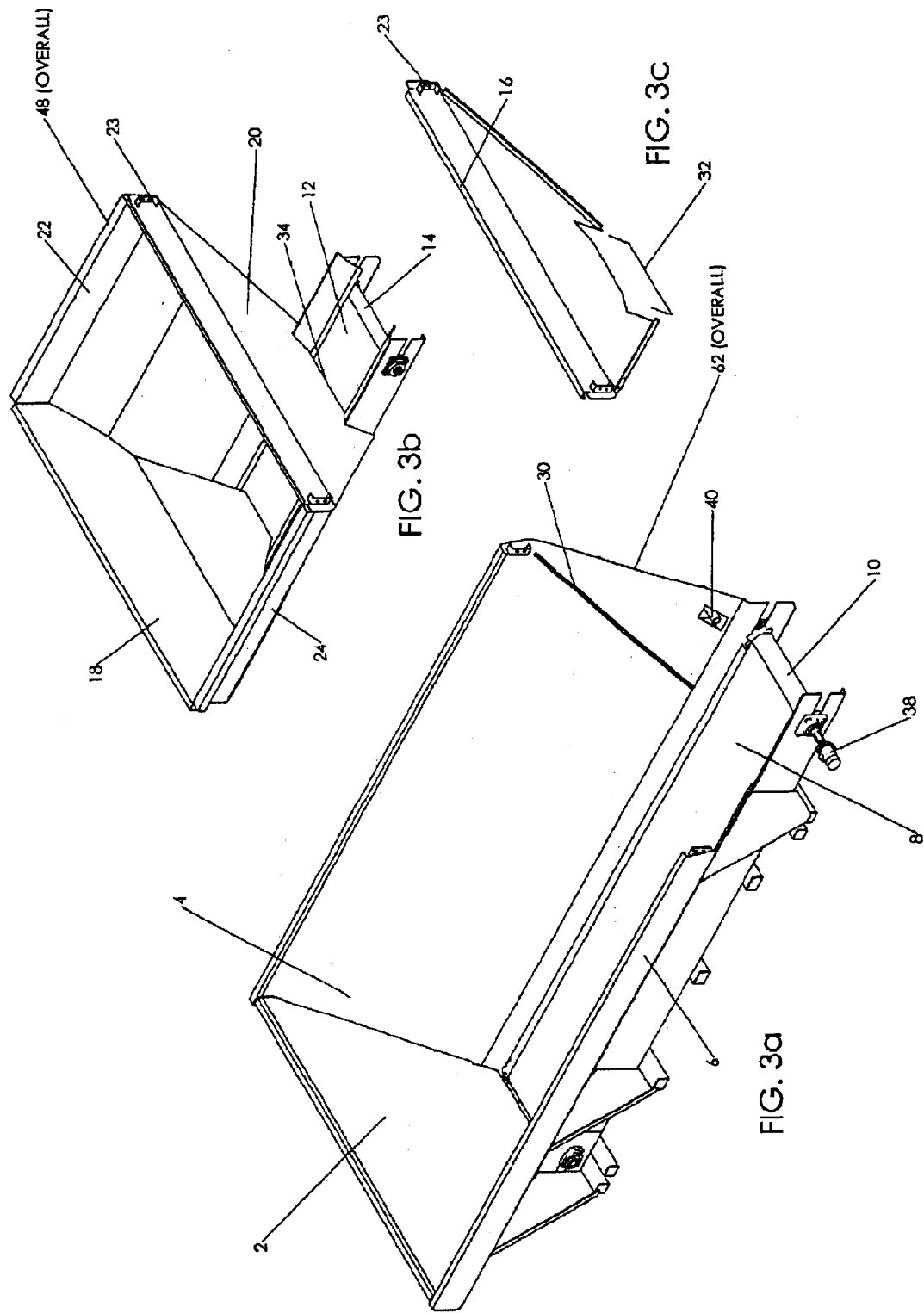

SECTION A-A

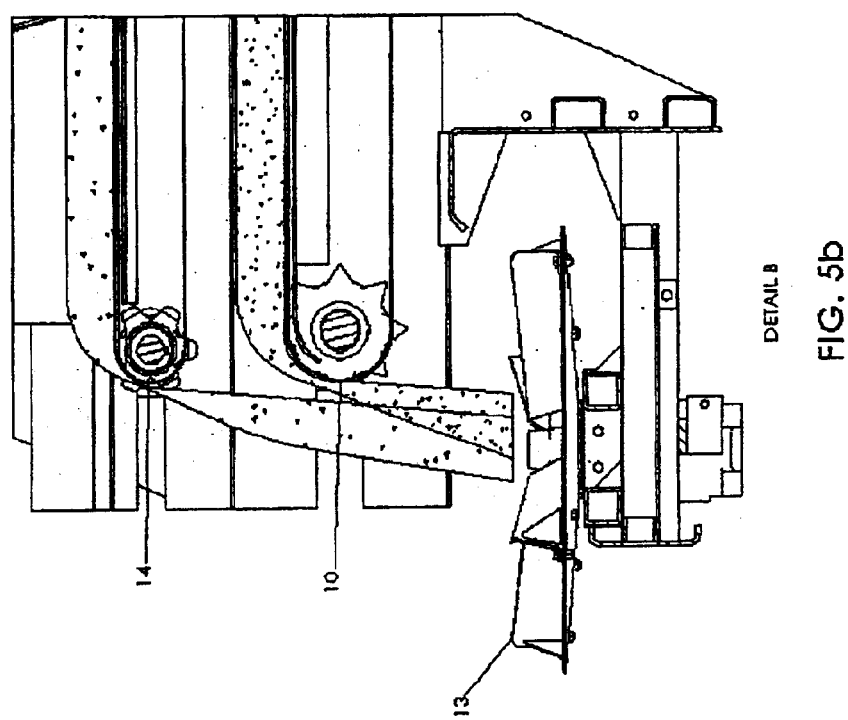

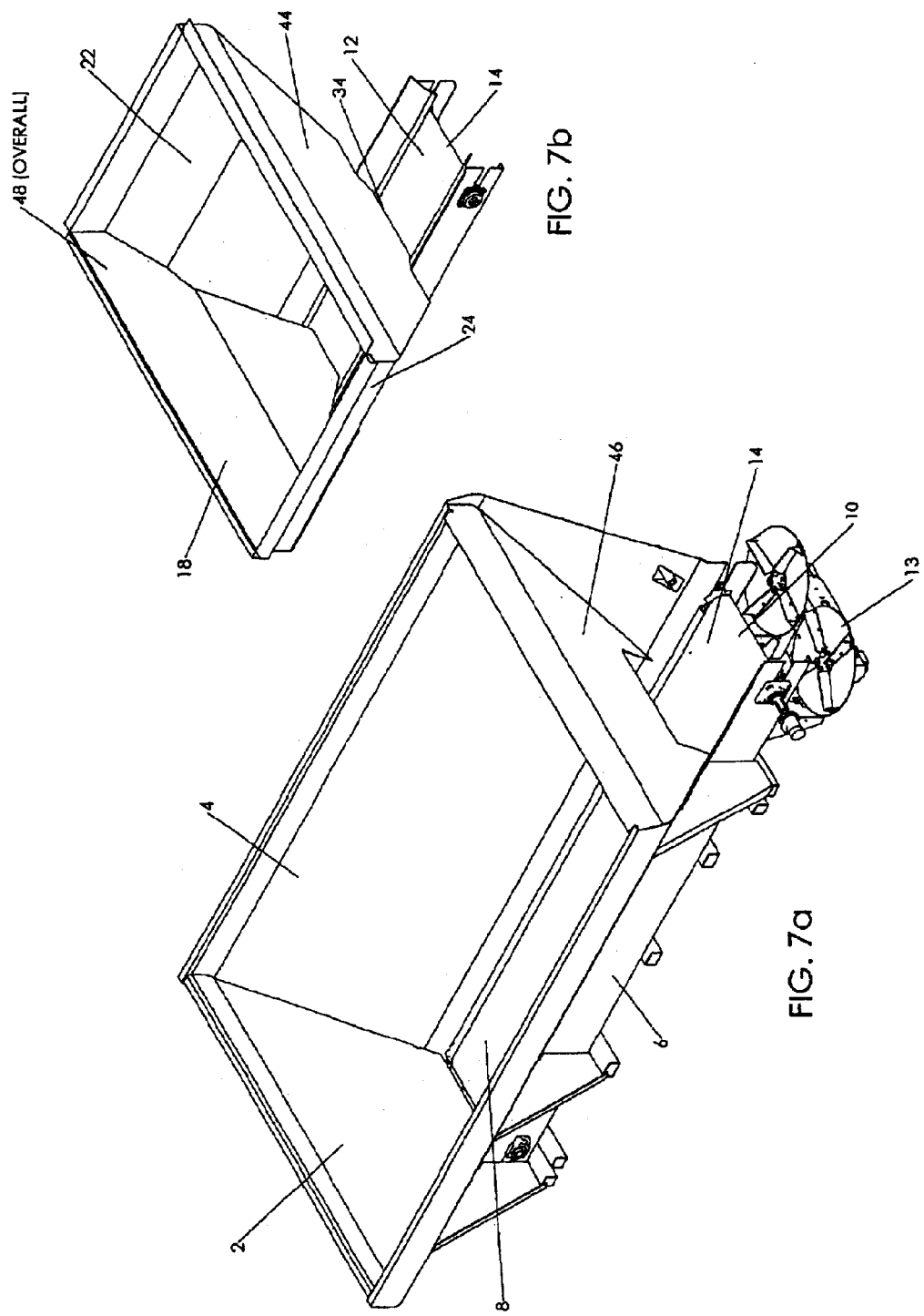

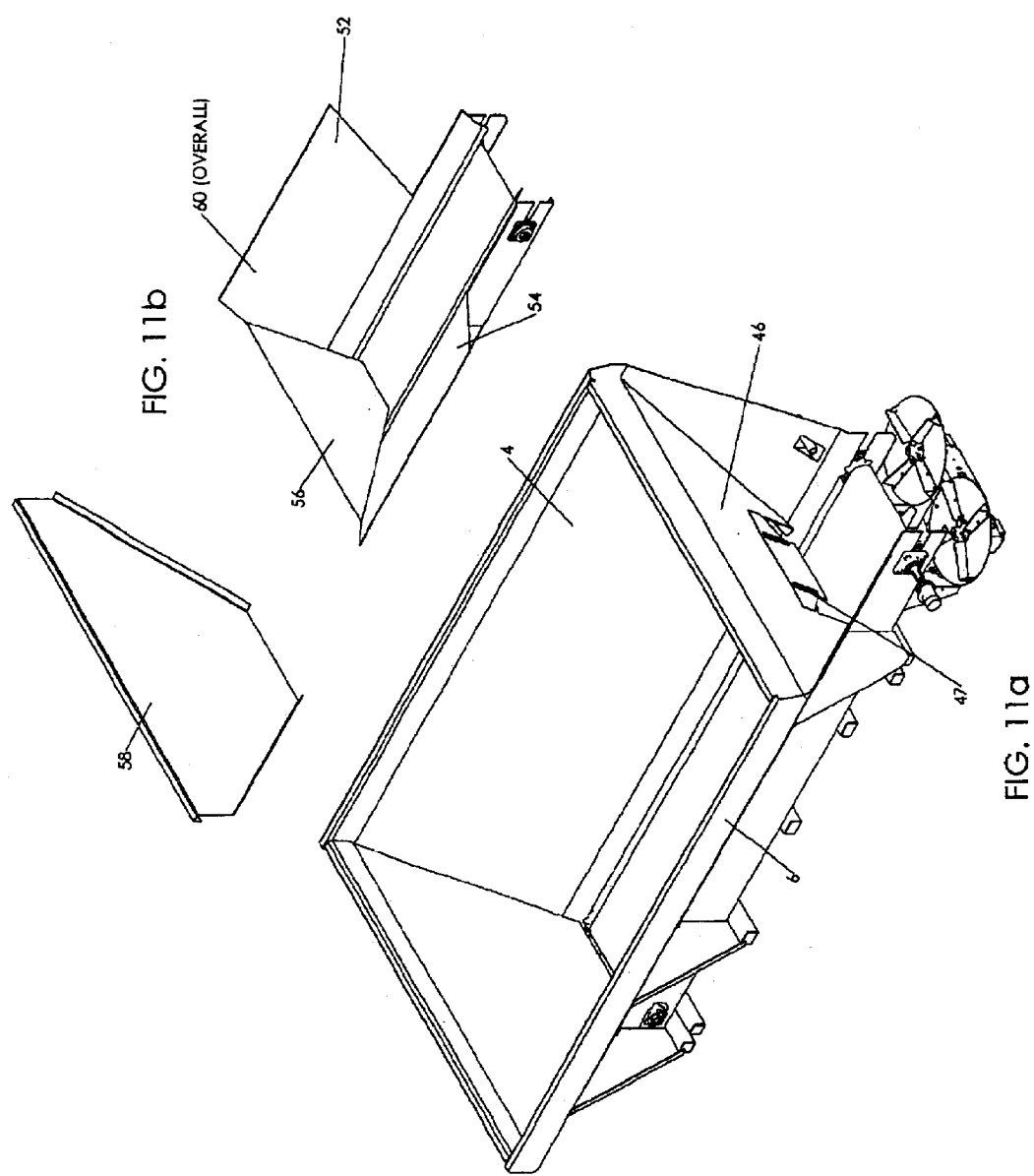

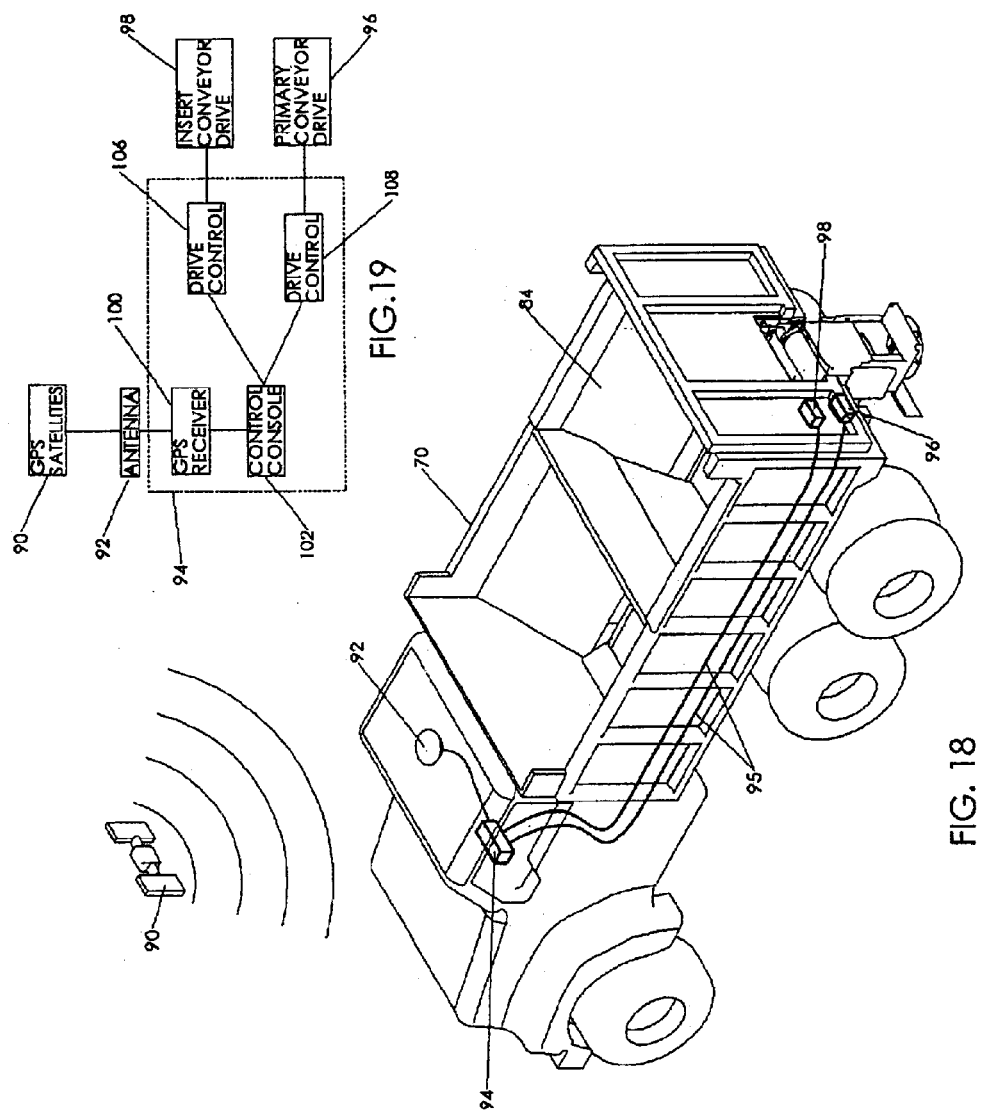

CONVERTIBLE PLURAL BIN AND CONVEYOR MATERIAL SPREADER

BACKGROUND OF INVENTION

It is desirable in the setting of agricultural field treatment to provide multiple supplements to the soil. Supplements may include fertilizers such as nitrogen, phosphorus, and potassium, pH balancing factors such as lime, and various chemicals, including herbicides and pesticides. It is known to provide agricultural material spreaders with a plurality of bins to allow operators to selectively release one or more materials, or to selectively release a carefully determined mixture of materials, from a spreader during a single pass through a field. This known method allows the operator to limit unnecessary and unproductive travel to and from fields, excess loading and unloading of bins, and excess passes through fields. Fuel expense, invested time, and vehicle wear and tear are all substantial costs associated with spreading materials. Therefore, it is highly desirable to achieve material spreading while limiting these costs. The present invention is an improvement over the existing technologies. The present invention maximizes applicators' ability to extract multiple functions from a single piece of equipment, thereby minimizing investment and allowing equipment configuration modifications to enhance efficiency.

Prior patents that disclose technology related to plural bin material spreaders relate to "precision farming," a practice that includes the collection of detailed information about soil types at various locations in a field and the calculation and application of appropriate materials to those locations by a spreader coupled to a location sensor. Examples of such patents include U.S. Pat. Nos. 4,630,773 and Re. 35,100. The '773 patent discloses a spreader having plural bulk material holding compartments or bins, each with an associated metering device for the release of material onto a single conveyor for conveyance to a spreading device, such as a spinner. This structure is disclosed as being coupled with a positioning, mapping, and control system. Such a configuration does not allow conversion to single bin use, as may be desired for application of lime. Further, the metering devices of the '773 patent do not readily accommodate materials that tend to bind, such as lime, or that display poor flowability characteristics.

Other known art relates to plural bin material spreaders having multiple conveyors. Examples include U.S. Pat. Nos. 5,950,933, and 5,052,627. The '933 patent discloses a dual bin, stacked conveyor arrangement within a major compartment wherein the major compartment is subdivided by a movable wall to form a secondary compartment of selectable dimensions. The '627 patent discloses parallel conveyors within a major compartment and a supplemental, exterior compartment for the release and entrainment of a minor component into a conveyed material stream.

The prior art fails to disclose a convertible system convenient for use as a single or converted plural bin spreader or for use with materials having dramatically different flowability characteristics. A convertible system is desirable because in given fields, some materials are applied at much higher rates than other materials—sufficiently higher rates to demand a dedicated spreader having full bin capacity available for one material or one material mix. In such applications, use of primary bin volume to house a secondary bin, walls, or conveyor is wasteful, and necessarily limiting to the single material load size. Further, some materials (such as lime, or in the alternative setting of roadway deicing, salt and sand) tend to clump or form concrete-like masses that may clog machinery. Such materials are preferably carried and dispensed with a minimum of structural components that may promote clogging. Given these material characteristics and varying application rate demands, there is a definite need for a material spreader having the capability to serve at times as a simple conveyor for a single batch of bulk materials without excess machinery and obstacles that may be subject to clogging. There is a further need to provide such a spreader that is convertible for use as a plural-bin applicator. Such convertibility may decrease overall equipment costs for operators to the extent that it allows for convenient conversion and consolidation of functions into one functionally adaptable machine rather than multiple machines.

Prior art machines fail to provide this convertibility. For example, the device of the '773 patent is limited to application with materials that will not clump or clog in the metering wheels. Further, the '773 patent fails to disclose—or to suggest—the need to provide for convertibility between a simple single bin and conveyor spreader and a multiple bin design.

There is similarly a need for a convertible plural bin and conveyor material spreader in the field of roadway materials application. For the majority of surfaces that may require chemical, salt, or sand treatment to increase friction and reduce freezing temperature, traditional materials, such as bulk, inexpensive road salt, may be used. This relatively inexpensive material has the disadvantage of being highly corrosive and, therefore, being undesirable for application to bridges, overpasses, and other selected structures or surfaces that are highly reinforced by materials subject to corrosion, such as iron or steel within concrete. For such structures or surfaces, a more expensive, less corrosive deicer is often specified. An example of such a deicer is Calcium Magnesium Acetate (CMA). Due to a dramatic difference in cost between traditional roadway salt and CMA, it is necessary to limit the application of CMA to only those areas where the presence of, and need to protect, reinforcing steel demands such use. Therefore, it has been necessary to use separate trucks for the transport and application of CMA and traditional materials application. It has further been necessary for CMA-carrying trucks to cover many miles without releasing material during travel as the truck moves between sensitive bridges, overpasses, etc. There is, therefore, a need for a material spreader that will accommodate the transport and selective application of bulk and custom application materials from a single unit. There is a further need for such a spreader that is convertible between simple, single bin use and the plural bin use identified herein as advantageous. Finally, there is a need for such a spreader wherein conveyance and spreading means may accommodate materials of a nature that bind or tend to form conglomerations when exposed to environmental conditions.

In roadway applications, the dual goals of providing traction (primarily via the application of sand) and reducing the freezing temperature (primarily via the application of salt) vary in importance depending on numerous factors (e.g. incline, curve embankments, traffic volumes, anticipated temperatures, etc.). Historically, operators would pre-mix components, such as salt and sand, to load a vehicle for application to a variety of road surfaces. This necessarily entailed labor to create the mix (via skid loaders or other equipment). Further, it necessarily resulted in too much salt or sand on some surfaces and too little salt or sand on other surfaces. Therefore, there has been and remains a need for a system that eliminates the need to premix components in a fixed ratio and provide for on-the-fly adjustment of salt-to-sand ratios for application to various targets that will be encountered, such as ramps, intersections, curved road sections and straight road sections.

Whether in the field of agriculture, road or pavement deicing, or other applications, convertibility allows farmers, companies, and state and local governments to maximize the functionality of their fleets. At times of shrinking budgets, the ability to derive multiple uses from a single piece of equipment or from a single platform presents tremendous cost savings. Dump body vehicles need to be usable for earth moving, debris removal, salt or sand spreading, and, as disclosed above, plural materials spreading. Highway Equipment Company has previously demonstrated the commercial advantages of convertible equipment, and the present invention is a further improvement in convertible equipment technologies. Through convertibility, a fleet can achieve year-round use, minimize equipment dormant periods, and minimize the number of vehicles that need to be purchased.

SUMMARY OF INVENTION

The present invention is a convertible materials applicator having a secondary bin and conveyance means insert. The plural bin functionality may be imparted through a variety of insert walls. In a preferred embodiment, a primary bin or compartment having a centrally located belt-type conveyor positioned generally along the center of the bottom wall of the bin is adapted to receive an insert secondary bin and conveyor. Operation of the dual conveyor configuration allows simple and convenient control of materials release from plural bins without the infirmity of substantial delays as may be caused when a product mix is placed on a conveyor by metering devices remote from the point of spreading and when the application of that mix by the spreader is delayed to allow transport of a desired mix via the conveyance means to the spinner or other spreading or release device. Rather, the dual conveyors provide a spreader with a controllable release of a desired mix through manipulation of individual product streams by manipulation of conveyor or conveyance means speed. In single bin operation, without the inserts or walls installed, the present invention may serve as a traditional, simple bulk material spreader with maximum materials-carrying capacity unhindered by fixed, interior walls. The following description and drawings are directed primarily towards stand-alone units that an operator may mount on a vehicle or trailer. However, it will be understood by those skilled in the art upon learning the presently disclosed technology that the present invention encompasses convertible plural bin and conveyor spreaders that are dedicated spreading vehicles, insert devices for dump bodies, or multipurpose dump body vehicles wherein the primary bin may be raised to effect material dumping in addition to a controlled conveyance means for transport of material to be released.

BRIEF DESCRIPTION OF DRAWINGS

FIGS. 3(a)–(c) are offset top rear perspective views of a first preferred embodiment of the present invention in a deconstructed state showing the primary bin rear wall and insert detached from the primary bin.

FIG. 5(b) is a detailed side elevation section view at detail B of FIG. 5(a).

FIGS. 7(a)–(b) are offset top rear perspective views of the second preferred embodiment of the present invention in a deconstructed state showing the insert detached from the primary bin.

FIGS. 11(a)–(b) are offset top rear perspective views of an insertable, partial-body bin and conveyor for the third preferred embodiment in a deconstructed state showing the insert detached from the primary bin.

FIG. 18 is an offset top rear perspective view of an alternate embodiment of the present invention which includes a GPS satellite.

FIG. 19 is a block diagram of an electronic system of the present invention; the dotted line labeled 94 around items 100, 102, 106 and 108 is intended to convey that these items are depicted as item 94 in FIG. 18.

DETAILED DESCRIPTION

Figure 1:
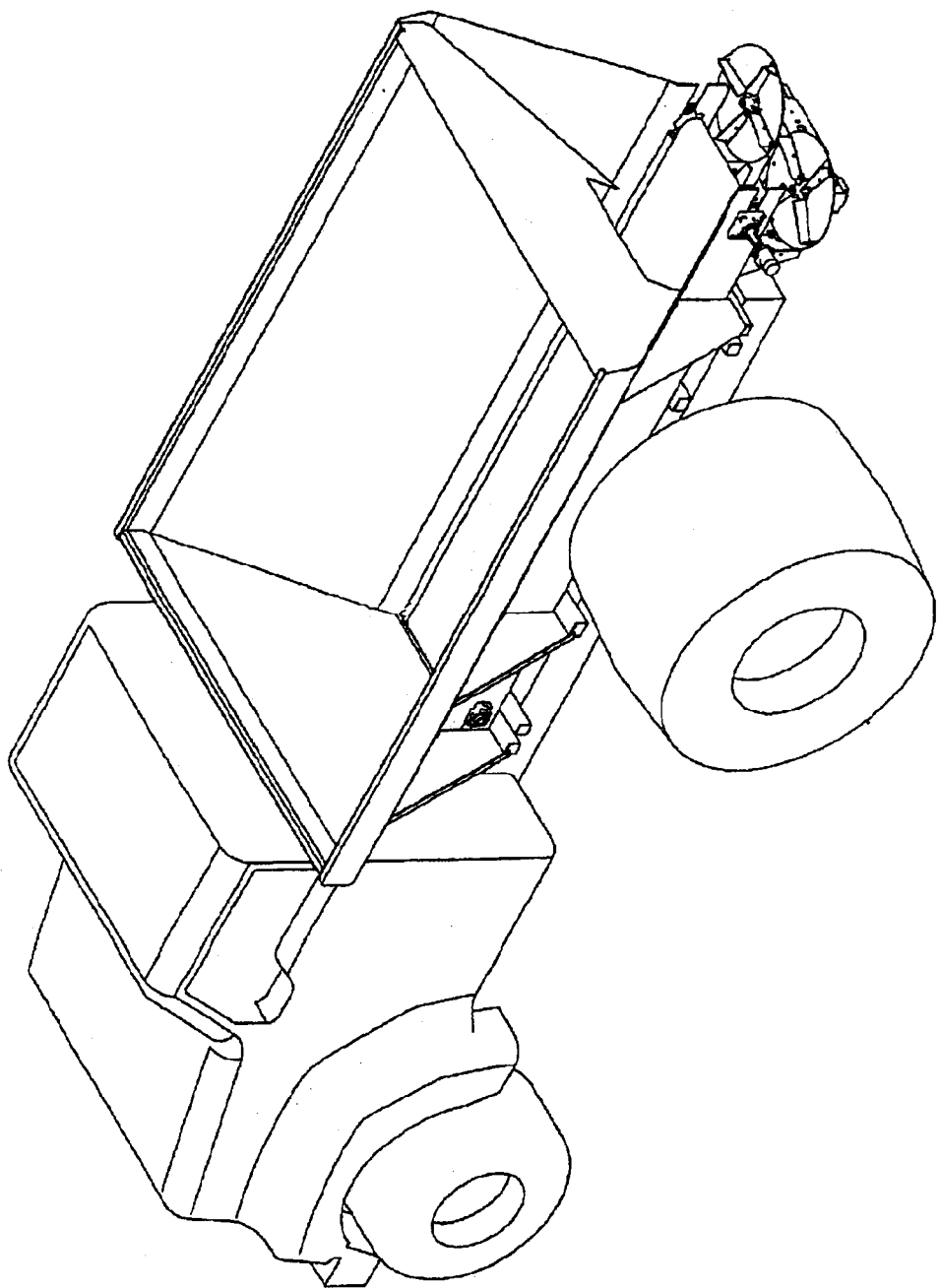
FIG. 1 (prior art) is an offset top rear perspective view of a single-bin, center conveyor, v-body hopper and spreader mounted on a vehicle chassis.
Figure 2:
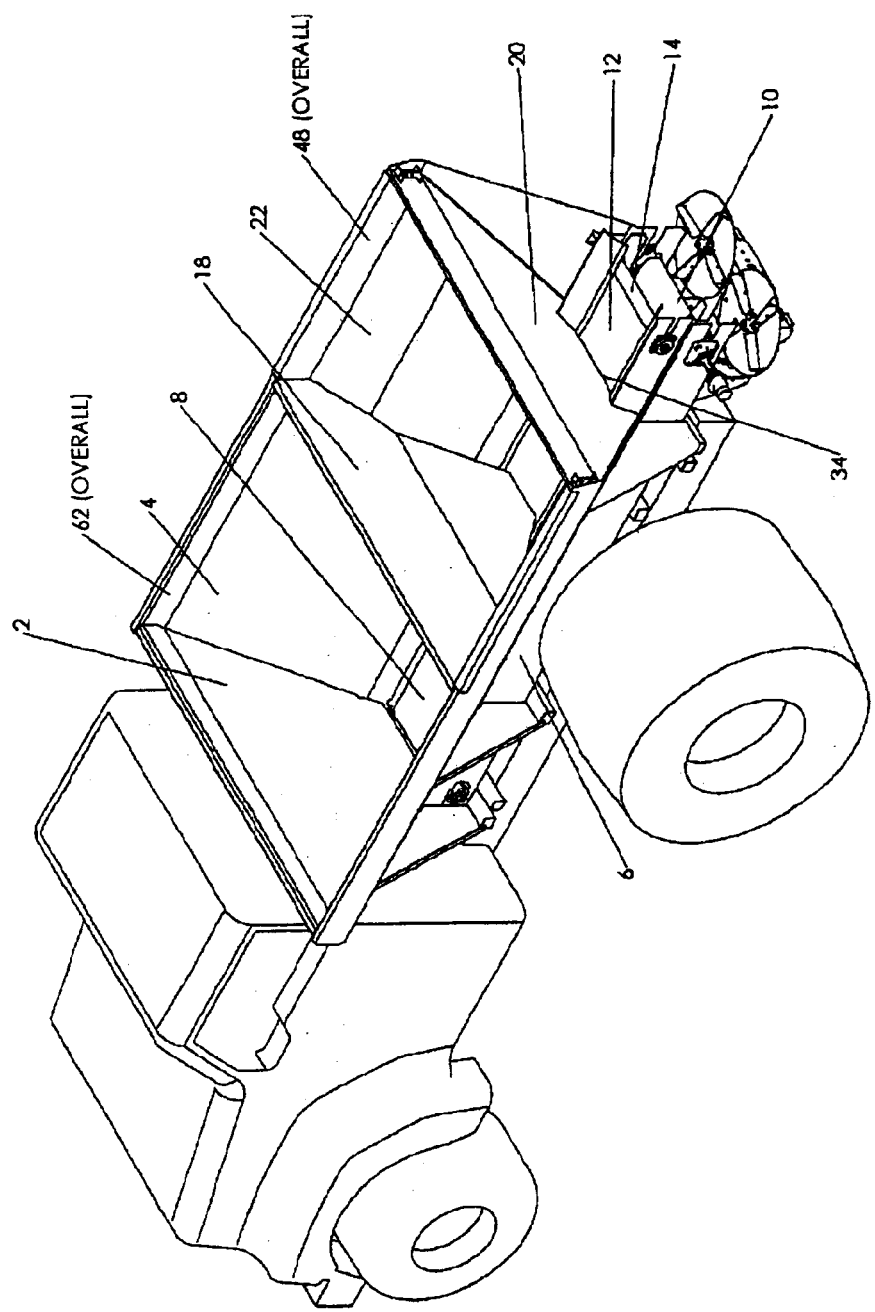
FIG. 2 is an offset top rear perspective view of a first preferred embodiment of the present invention in a dual bin, assembled configuration in the environment of a vehicle.

FIG. 1 (prior art) is a typical, single-bin, center-conveyor, v-body hopper with a spinner-type spreader disposed below the conveyor. The present invention is an improvement upon this prior technology. With reference first to FIGS. 2 and 3(a)–(c), a preferred embodiment of the present invention is shown. A primary bin 62 (overall) comprising a primary bin front wall 2, a first 4 and second 6 primary bin side wall, and a primary bin removable rear wall 16 (shown in FIG. 3(c), but not shown in FIG. 2) is provided. The primary bin 62 has located along its bottom a primary conveyor 8. The primary conveyor 8 is illustrated as an endless, belt-type conveyor. However, the present invention may be practiced with any conveyance means practical for the purpose explained herein. For example, drag chains, bar flight chains, augers, or other conveyance means may be employed. In FIG. 2, the primary bin removable rear wall 16 is removed and an insert 48 (FIG. 3(b) overall) is mounted in the primary bin 62. The insert 48 comprises a secondary conveyor or conveyance means 12 disposed at the bottom of a secondary bin having a first 22 and second 24 secondary bin side wall, a secondary bin front wall 18 and a secondary bin rear wall 20. The secondary bin rear wall has a secondary bin rear wall opening 34 formed therein. When mounted in the primary bin 62, the insert 48 is disposed rearwardly within the primary bin 62, and the secondary conveyor 12 is disposed above the primary conveyor 8. The insert may be secured by any convenient means, but it is preferred to use flanges 23 on the top outside corners of the bin rear wall 20 and front bin wall 18 that mate with opposing flanges of primary bin side walls 4 and 6 that receive threaded fasteners. In a like manner, the removable rear wall 16 is attached using flanges 23 that mate with opposing flanges of primary bin side walls 4 and 6 that receive threaded fasteners. In addition, removable rear wall 16 bottom edge channels 23 engage side wall flange 30 to further secure the rear wall.

Figure 5A:
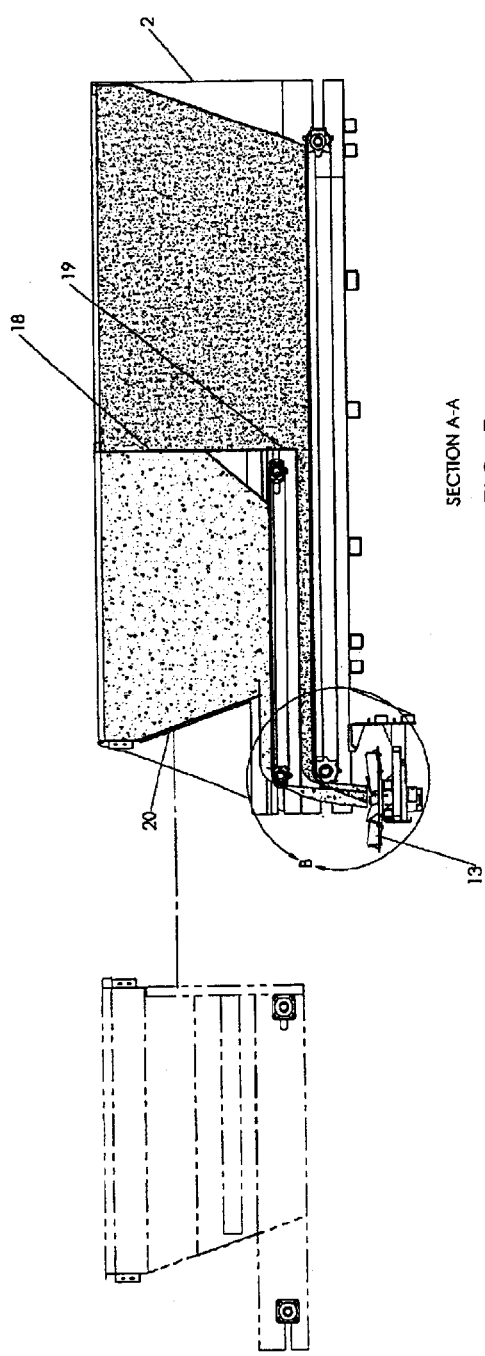
FIG. 5(a) is a side elevation section view at section AA of FIG. 4 and an associated phantom side elevation of the insert and the general direction of assembly.
Figure 4:
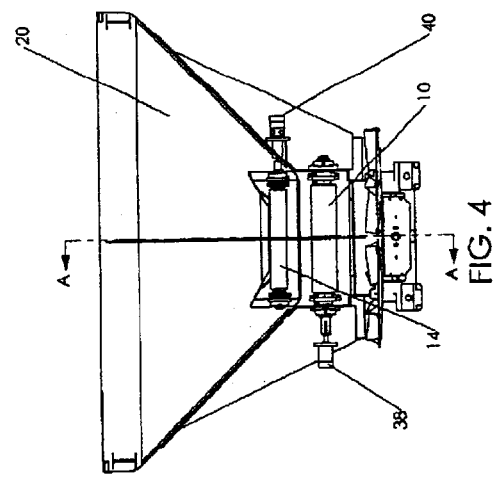
FIG. 4 is an end view of the first preferred embodiment in a dual bin, assembled configuration.
Figure 6:
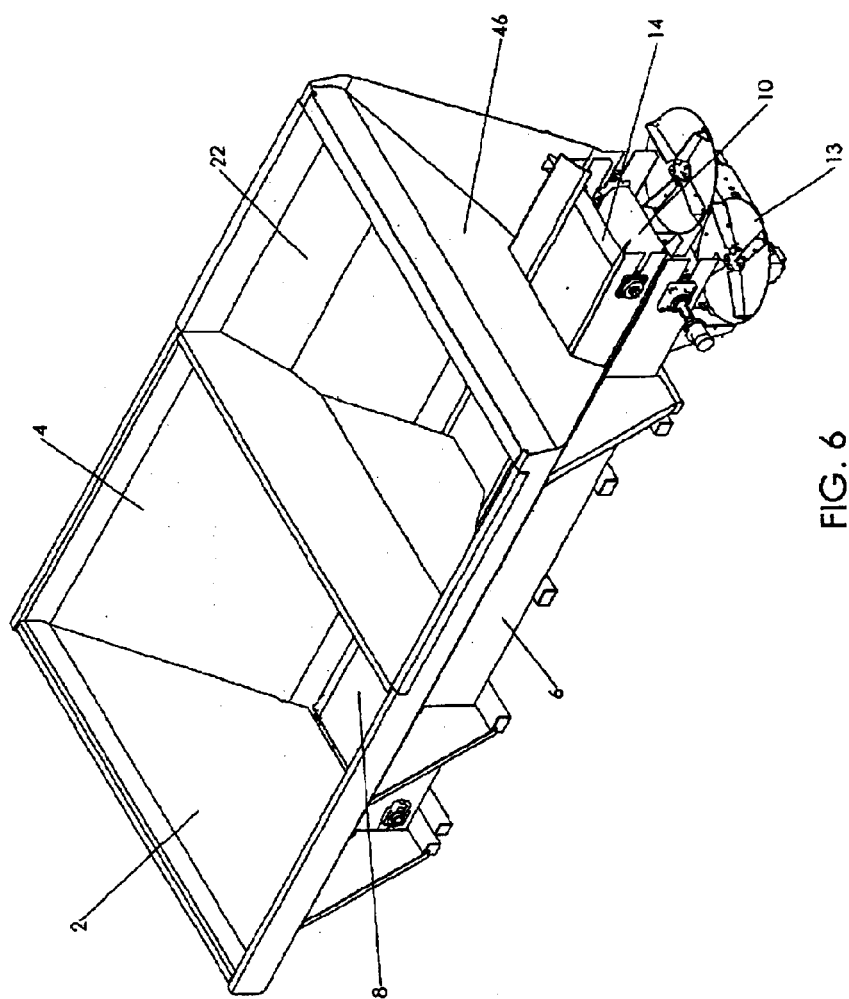
FIG. 6 is an offset top rear perspective view of a second preferred embodiment of the present invention in a dual bin, assembled configuration.

When the insert 48 is not mounted in the primary bin 62, an opening 32 formed in the primary bin removable rear wall 16 limits the depth of material that may be conveyed rearwardly out from the primary bin 62. This opening may define a fixed height, or it may incorporate an adjustable metering means, such as a movable gate to allow a greater or lesser material flow rate for a given conveyor speed. As illustrated in FIGS. 3(a)–(c), the convertibility of the material spreader of this first embodiment is achieved through the removal of the primary bin rear wall 16 and replacement with the insert 48. As illustrated in FIG. 5a, the bottom 19 of the secondary bin front wall 18 forms a fixed gate 19, or a mounting surface for an adjustable metering means, such as a movable gate, to control the depth of material that may be transported along the primary conveyor 8 under the secondary bin 48. FIGS. 4 and 5(a)–(b) illustrate a preferred arrangement of conveyor rear ends 10, 14 wherein the rear ends or drop points 10, 14 for the secondary 12 and primary 8 conveyors are vertically stacked and generally aligned with one another to allow materials to be dropped together upon a spreading, dispersal, or further conveyance means, such as a spinner 13. Although this is the preferred arrangement, the present invention is not limited to a particular alignment of conveyor ends 10, 14 relative to one another or to the central placement of conveyance means 8, 12 or dispersal means 13. The secondary bin rear wall opening 34, through which the secondary conveyor 12 extends, serves as a fixed gate or as a mounting surface for an adjustable metering means, such as an adjustable gate to control the depth of material flow along the secondary conveyor 12.

When used in the plural bin arrangement as described, this preferred convertible spreader provides for user control of materials release through user control of the conveyors 8, 12. With fixed openings 19, 32, 34 (as shown) or with adjustable metering means to limit the depth of material released from the bins, there will be a selected depth of particulate material available to be dropped from each conveyor rear end 10, 14 upon actuation or change of conveyor 8, 12 motion. The rate of materials application will, therefore, be a function of gate height, metering rate selection, vehicle speed, conveyance means speed, and spread pattern (spread pattern will be dependent upon particular spread apparatus selection and operation; i.e., spinner, pneumatic booms, etc.). Particulate material mixing and individual application rates of the components of a particulate material mix may, therefore, be controlled by independently controlling the primary 8 and secondary 12 conveyors. In this manner, the need to premix components into a desired ratio prior to loading into a bin, may be eliminated. As is commonly practiced with conventional devices, whether in agricultural or road deicing settings, operators would traditionally select a mix (fertilizers, salt/sand, etc.) ratio, prepare a batch of material according to the selected mix ratio, and load bins. This would typically occur via skid loaders and other general-purpose equipment available at a materials storage facility. This "pre-mix" step may add dramatic labor, time, and expense to loading and spreading operations. With the present invention, components may be simply loaded, and mixing may occur on-the-fly as an operator adjusts conveyor speeds to alter the rates of application of individual components.

In agricultural field applications or in roadway deicing applications, it may be desirable to operate the primary 8 and secondary 12 conveyors alternately rather than in controlled relationship with one another. In other words, an operator may desire to place on selected surfaces individual, selected materials, rather than a controlled mix of materials. This may be the case in field regions where only one of the transported materials (i.e., only material from one bin) is needed to supplement the soil. This may also be the case on the previously identified, steel-reinforced surfaces and structures that require custom deicing chemicals rather than bulk roadway salt. In such a mode of operation, operator decisions may be limited to simply choose between actuation of a first or second conveyor, depending on the surface beneath the spreader.

FIGS. 2–5(b) illustrate a primary 38 and secondary 40 conveyor drive for the primary 8 and secondary 12 conveyance means respectively. It is preferred to provide the secondary conveyor 12 with components of a conveyor drive 40 on the primary bin 62 rather than the insert 48. In this manner, the complexity, weight, and control systems for the insert 48 may be minimized. Further, such an arrangement allows extensive controls, hydraulic or electric lines, and other power means to be housed along the primary bin 62 and protected from damage that may occur as the insert 48 is separately moved and handled. In selected applications, especially in the case of retrofitted existing equipment, it is preferred to place all or substantially all of the secondary conveyor drive components 40 on the insert 48.

FIGS. 5a and 5b illustrate the blending of particulate material as the shaded regions of the primary bin 62 and insert 48 illustrate two separate materials, as can be seen best in FIG. 5(b). The delay between (1) actuation or change of conveyance means speed and (2) actual application of the adjusted materials mix, is virtually eliminated.

By contrast, prior art machines, such as the multiple-bin applicator of the '773 patent, may place a selected mix on a conveyor or conveyance means and continue to release that prior mix until the desired mix is transported to the point of release. Under the present invention, precise mix control at desired release location may be achieved without complex control systems.

Figure 9:
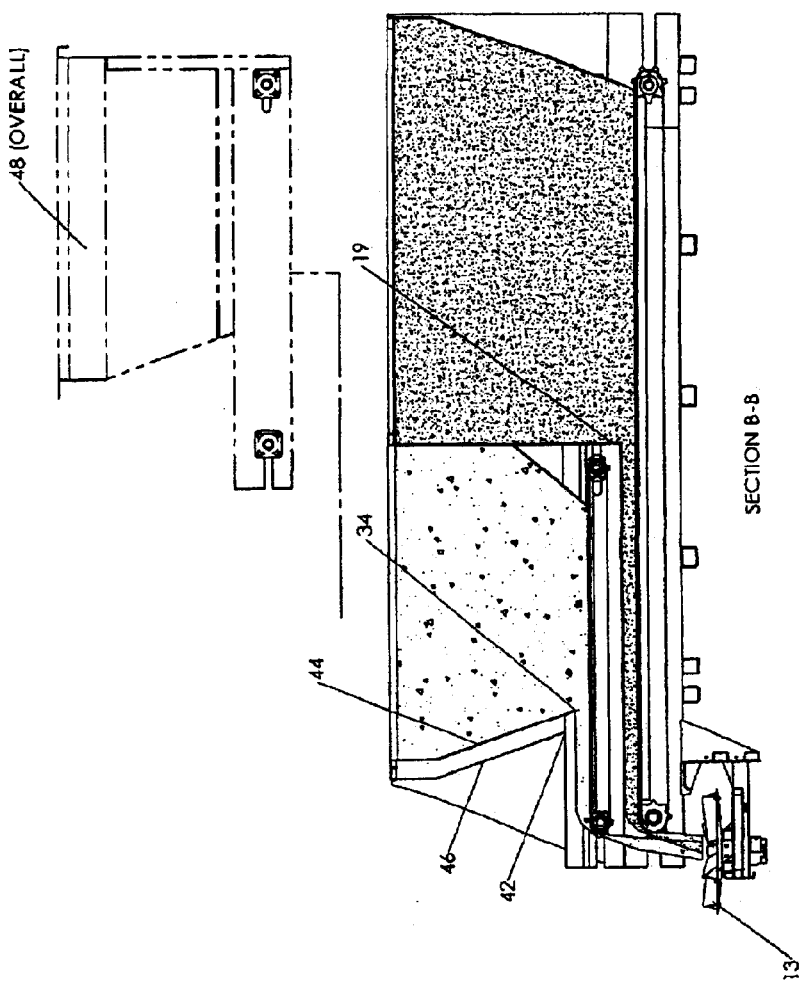
FIG. 9 is a side elevation section view at section BB of FIG. 9 and an associated phantom side elevation of the insert and the general direction of assembly.
Figure 8:
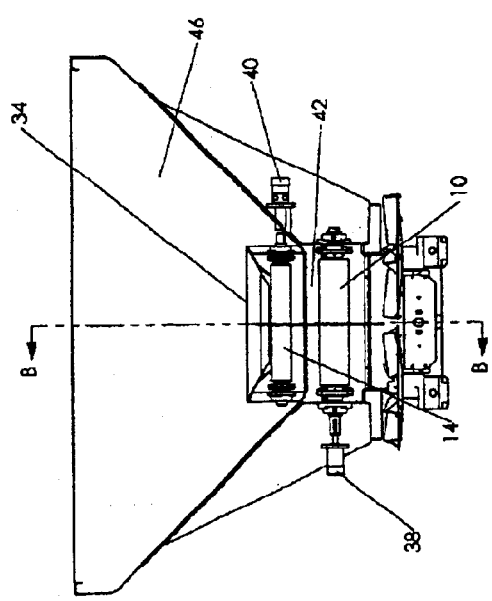
FIG. 8 is an end view of a second preferred embodiment of the present invention in a dual bin, assembled configuration.

A second embodiment is illustrated in FIGS. 6–9. This second embodiment is similar to the first embodiment, except that the primary bin has a fixed rear wall 46. Unlike the removable primary bin rear wall 16 of the first embodiment, the primary bin fixed rear wall 46 requires that convertibility entail the dropping-in of an insert 48 and the threading of the secondary conveyor 12 rearward through the opening 42 formed in the primary bin fixed rear wall 46. When so mounted, the secondary bin rear wall 20 will face, rather than replace, the primary bin fixed rear wall 46 (in the first embodiment, the insert 48 could simply be dropped in after the primary bin rear wall 16 was removed). FIGS. 7(a)–(b) illustrate the insert 48 according to this second preferred embodiment. FIGS. 8 and 9 illustrate that the preferred relative placement of the conveyors 8, 12 and conveyor ends 10, 14 are similar in both the first and second embodiments. Again, however, it is noted that mixing as desired may occur without precise placement of the conveyor rear ends 10, 14 relative to one another.

In a third preferred embodiment, illustrated in FIGS. 10–13, a lighter version of the invention having a partial insert (60 overall) is provided. In this embodiment, the insert first 52 and second 54 side walls are truncated. With such a less massive insert 60, the side walls 4, 6 of the primary bin 62 serve as an upper portion for the insert side walls 52, 54. The partial insert forward wall 56 may be of any practical or desired height. As illustrated in FIGS. 11(a)-13, a truncated partial insert forward wall 56 is provided and a primary bin removable divider 58 is present at a location generally above the partial bin forward wall 56 to allow materials loading to the full height permitted by the primary bin side walls 4, 6. Benefits of the partial insert 60 include reduced materials cost for manufacturing and reduced weight that must be handled by operators during insert mounting and removal. A consequence of the selection of a partial insert is the possible need for seals to prevent leakage of materials between the primary bin and the partial insert 60 (where the need will depend on particulate material characteristics). For many materials to be applied with such equipment, de minimis leakage between compartments may not be of concern, and therefore, seals may not be required. As illustrated, the primary bin fixed rear wall 46 includes a movable gate 47 to accommodate the metering of materials from the primary bin while in single-bin configuration. As in the second embodiment, the partial insert version is preferably used in combination with a primary bin fixed rear wall 46. With such a fixed rear wall, the fixed wall large opening 32 is ideally situated for use with a movable gate to ensure adjustment to create a sufficiently small opening when the primary bin 62 is operated in single bin mode.

Figure 14:
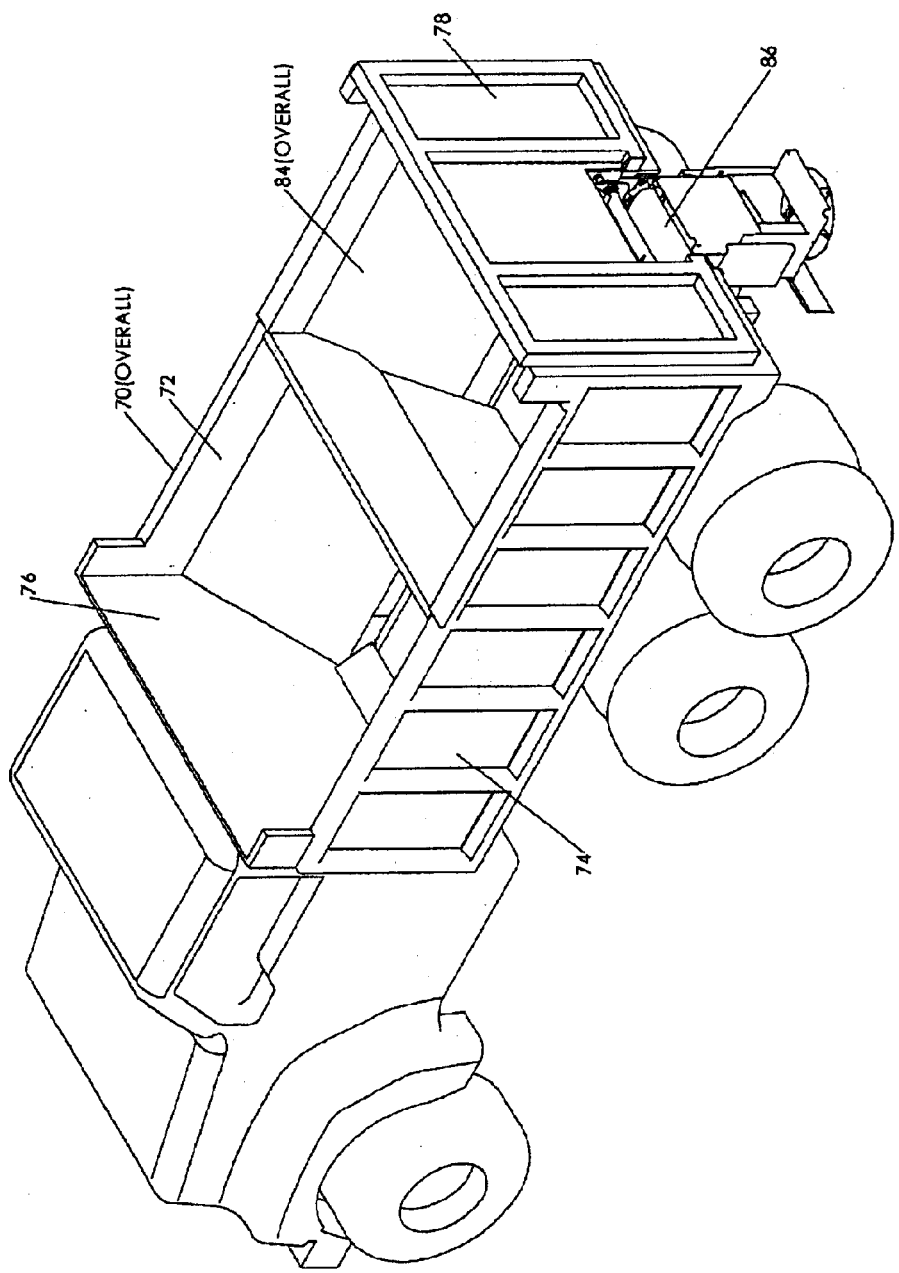
FIG. 14 is an offset rear perspective view of a center conveyor multi-purpose dump body version of the present invention having the secondary bin insert mounted thereon.
Figure 15:
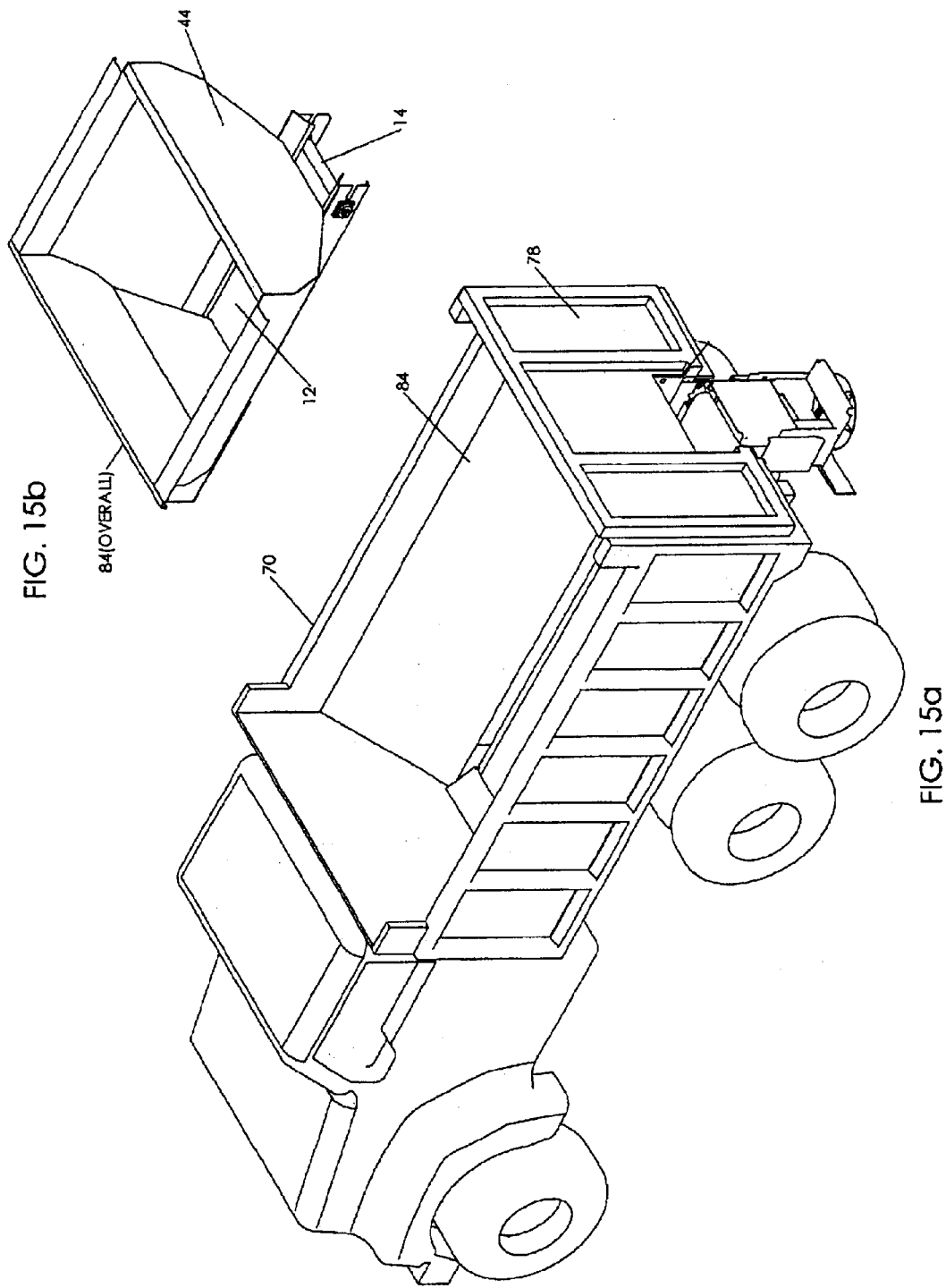
FIGS. 15(a)–(b) are offset rear perspective views of a disassembled dump body version of the present invention having the secondary bin insert removed therefrom.

FIGS. 14 and 15(a)–(b) illustrate a multipurpose dump body version of the present invention. Like the second embodiment discussed above, the preferred multi-purpose dump body configuration utilizes a dump body primary bin end wall 78 that may remain attached to the primary bin 70 during placement and use. The multi-purpose dump body primary bin 70 comprises a first 72 and second 74 primary bin side wall, a primary bin forward wall 76, the primary bin rear wall 78, and a primary conveyance means 86. As in the second embodiment, the secondary bin rear wall 44 will face, rather than replace, the primary bin fixed rear wall 78 and the insert 84 could simply be dropped in with the same preferred relative placement of the conveyors similar to that of the first and second embodiments.

Figure 16:
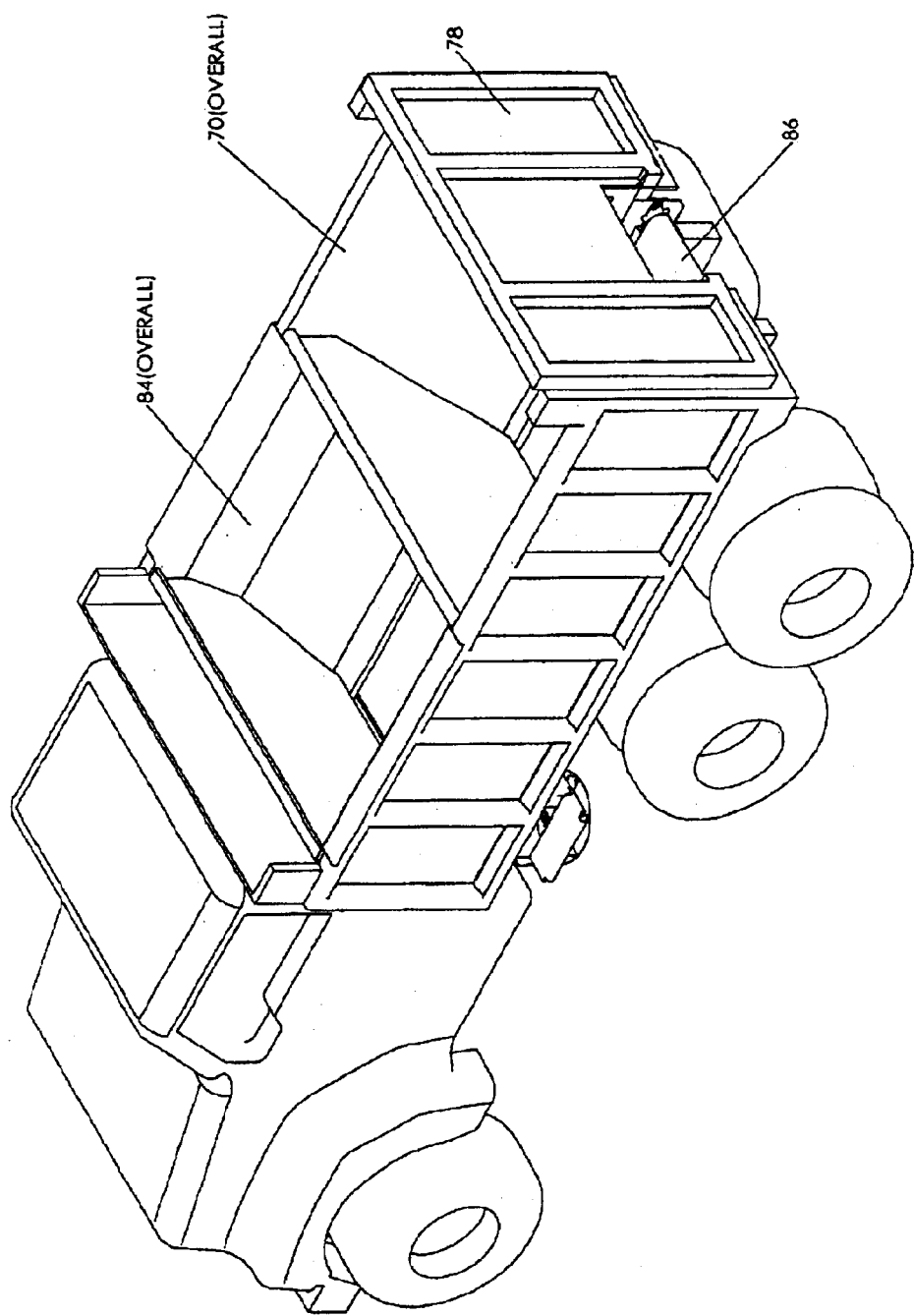
FIG. 16 is an offset rear perspective view of the present invention in the environment of a center conveyor multi-purpose dump body vehicle equipped with a front discharge and the secondary bin insert mounted with its discharge placed to the front.
Figures 17A, 17B:
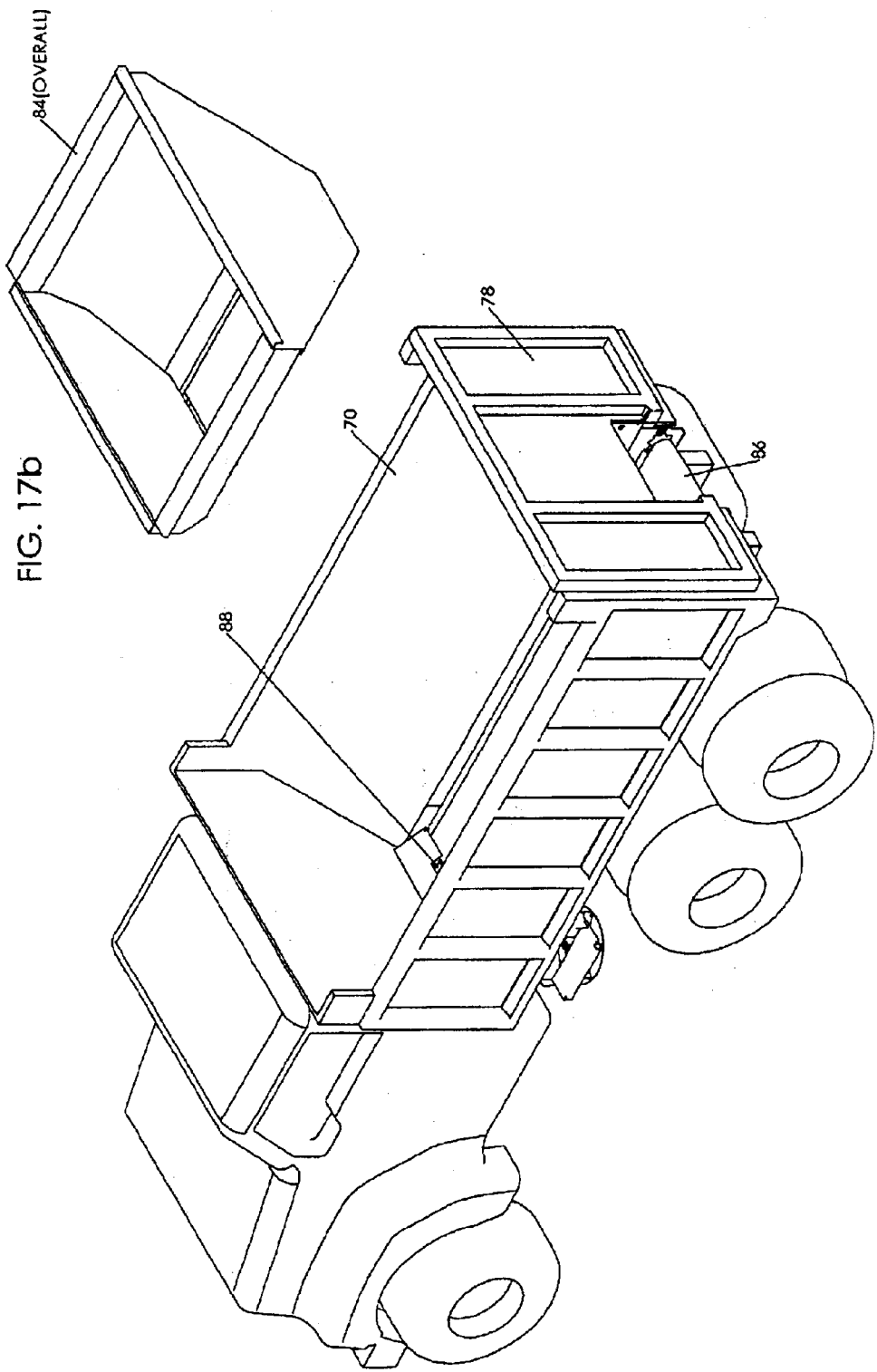
FIGS. 17(a)–(b) are offset top rear perspective views of a front discharge center conveyor multi-purpose dump body and the insertable bin in a deconstructed state showing the insert detached from the primary bin.

As will be understood by those skilled in the relevant art, it is often desirable to release materials at a side position, such as at the left of a vehicle, to place material near the center of a roadway rather than at a location near a road edge, where it may be swept off the road surface without achieving a desired deicing effect. It is also often desirable to release materials at a position in front of the vehicle wheels to aid traction on slippery surfaces. For both of the above cases, multi-purpose dump bodies are often equipped with a primary conveyance means capable of moving material forward through an opening in the forward wall onto an offset conveyance means which moves material to the center of the road and in front of the vehicle"s driving wheels. FIGS. 16 and 17(a)–(b) show the present invention placed in a multi-purpose dump body with a primary conveyance means 86, front wall opening 88, and the insertable secondary bin 84 that is rotated 180 degrees from the previous embodiments. For applications such as use of the multi-purpose dump body configuration for deicing materials application, precision control of mix placement and elimination of delay between mixing and release may be less critical. In such a setting, the supplemental conveyance means 82 provides a convenient method to transfer mixed materials to a desired release location. By providing a supplemental conveyance means 82, the convertibility advantages of the present invention (single bin/single conveyance with dual bin/dual conveyance convertibility) is further enhanced. In this manner, a single vehicle or insert can be adapted to provide dual materials conveyance and release, single bin materials conveyance and release, centered rear release, or supplemental-conveyance enhanced side release. Such multiple functionality allows maximum use of limited resources for fleet managers, municipalities, government agencies, and agricultural operators. Year-round functionality, as mentioned above, is of critical interest to the buyers of heavy-equipment. With dump body convertibility, deicing equipment may be used in single bin/conveyor, or dual bin/conveyor configuration during winter months, simple dump body configuration for hauling (snow removal, earth moving, etc.) during winter or summer months, or dual bin/conveyor configuration for other applications.

Now referring to FIGS. 18 and 19, there is shown an embodiment of the present invention which includes electronic equipment thereon for controlling operation of the material spreading apparatus of the present invention. There is shown a global positioning system satellite 90, in conjunction with an antenna 92 and a processing box 94. Also shown are primary conveyor drive 96 and insert conveyor drive 98. These conveyor drives are responsive to signals and/or power supplied on lines 95. The system may be configured to function as follows:

The GPS satellite 90 (in combination with at least two other GPS satellites) provides information to a GPS receiver 100, which is able to determine the position of the antenna 92 as it moves. The GPS receiver 100 provides the position information to the control console 102. Control console 102 can be a multi-purpose device, including a microprocessor, which determines what material needs to be applied based upon the position information provided by the GPS receiver 100. Control console 102 can also perform numerous other functions which are well known in the precision farming industry, as well as others. Drive control 106 and drive control 108 may be independent from control console 102 as shown, or they may be integrated with other hardware, software etc. Insert conveyor drive 98 and primary conveyor drive 96 are responsive to signals and/or power provided on lines 95.

The system of the present invention via control console 102 or other hardware or software can selectively and independently control the output rate of material from primary bin 70 and secondary bin 84. Control console 102 must contain a map, database or table which contains information regarding the roadway over which the system is operated. The map preferably contains information relating to the bridges, their locations, construction type, the type of preferred de-icing material, etc. Other information may be provided in the map, such as speed limits of the roadway, political boundaries, such as city limits, county and state boundaries, etc. Control console 102 may also include other hardware and software which can measure the attitude of the vehicle. This information can be used to affect the material and rates of application. For example, more sand may be applied when the vehicle is on a steep decline or the roadbed is laterally sloped beyond a predetermined threshold. Various changes can be made to the embodiment of the system of the present invention directed toward positioning systems and the automated control of application of road de-icing and traction materials. For example, while GPS is currently preferred, it may be desirable to generate position information from other sources, such as cellular or other mobile telephony systems, triangulation of signals from known radio and television transmitters, etc. and combinations and variations of the same. The hardware and software necessary in the present invention to carry out the above-described functions and activities and variations of them, may be located in the components as above described and depicted in the drawings. However, it should be understood all of the electronics of the present invention could be consolidated or distributed throughout the system. The precise location of structure to perform each function is a matter of design choice, and the appended claims are intended to include any system how ever the electronic components may be distributed or consolidated.

Figure 10:
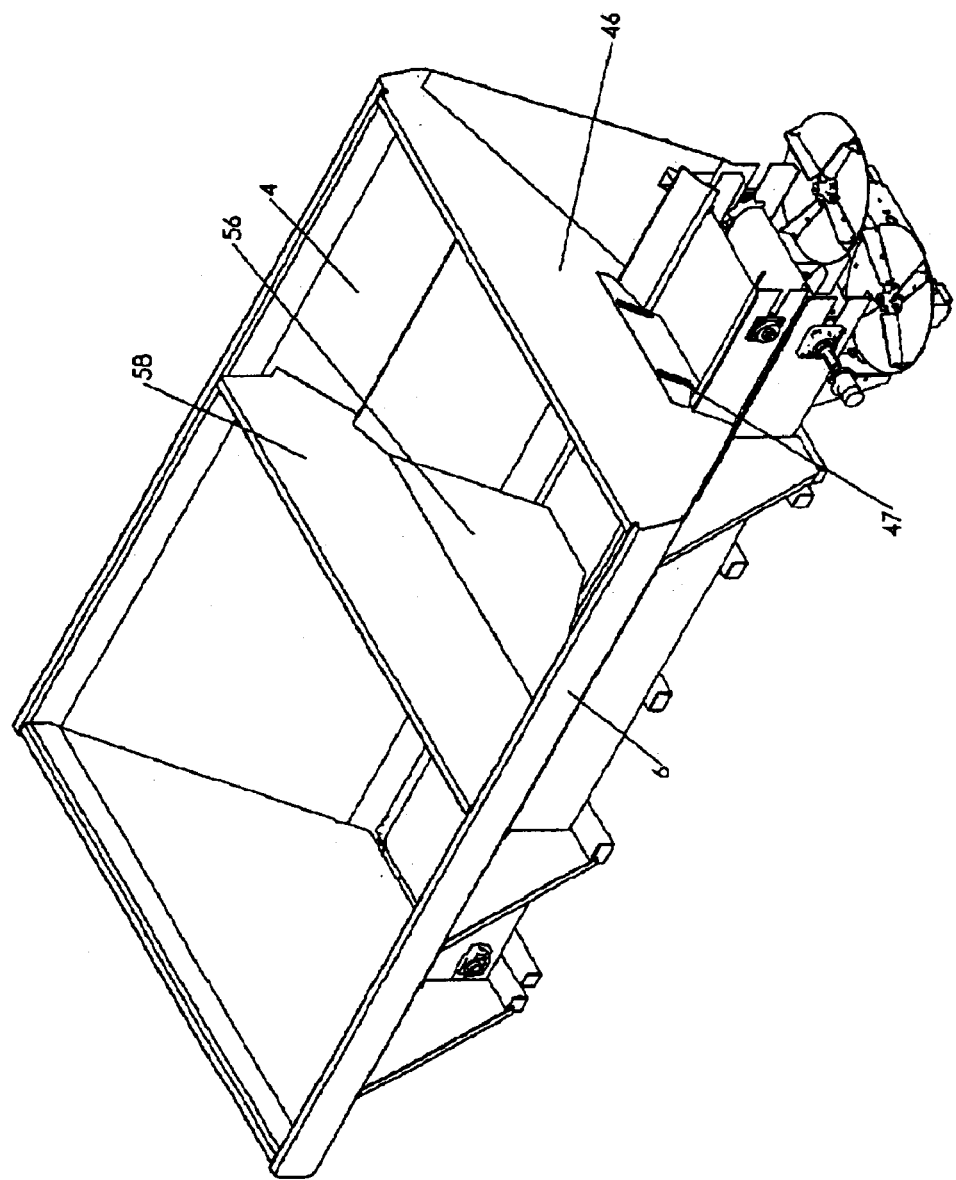
FIG. 10 is an offset top rear perspective view of a third preferred embodiment of the present invention in a dual bin, partial insert, assembled configuration.
Figure 13:
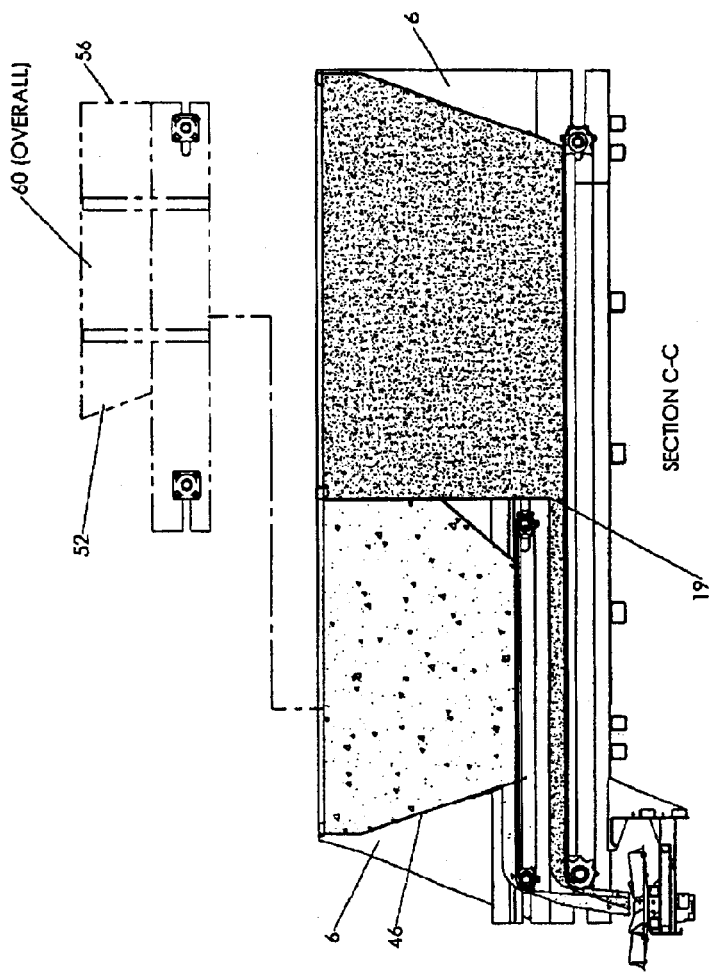
FIG. 13 is a side elevation section view at section CC of FIG. 14 and a phantom side elevation of the insert and the general direction of assembly.
Figure 12:
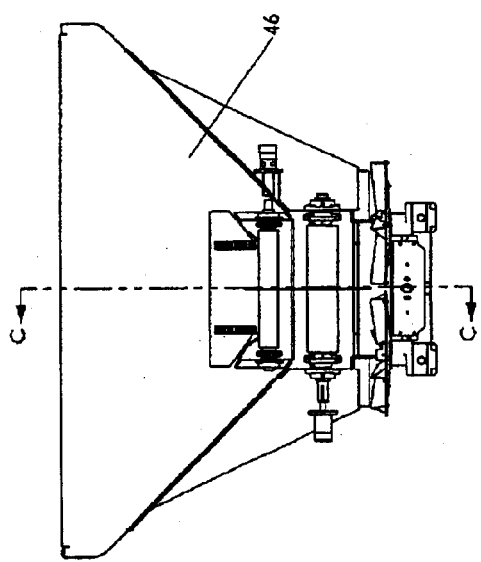
FIG. 12 is an end view of the third preferred embodiment of the present invention in a dual bin, assembled configuration.

Throughout this description, many references have been made to bins, primary bin and secondary bin. It should be understood that these bins may be V-shaped hopper-type bins as shown in the drawings, as well as various other well-known shapes and configurations. For example, the bins as discussed herein should be read to include any means for containing material such as V-shaped hopper bins, elliptically shaped bins, bins with sides which are a simple radius, bins with multifaceted side walls and various combinations or permutations of the same. Means for containing should be understood to include the partial bins and inserts as shown in FIGS. 10 and 11(b), as well as other partial bins of various shapes and configurations such as mentioned above.

Throughout this description, many references have been made to primary conveyor and secondary conveyor. It should be understood that these conveyors may be endless loop belt-type conveyors as shown in the drawings, as well as various other well-known styles and configurations. For example, the primary conveyor and the secondary conveyor discussed herein should be read to include any means for conveying or means for moving material, such as endless loop belt-type conveyors, augers, belt chains, etc. and various combinations or permutations of the same.

Throughout this description, many references have been made to spinners. It should be understood that these means for spreading, means for distributing or means for dispersing material may be the well-known spinners as shown in the drawings, as well as various other well-known devices for dispersing material. For example, the means for spreading discussed herein should be read to include any means for spreading material, such as the spinners, augers, blowers, conveyors, pneumatic booms, other centrifugal devices, other drop-type devices and various combinations or permutations of the same.

It will be understood by those of ordinary skill in the art upon learning the technology of the present invention, various substitutions may be made that fall within the scope of the present invention. For example, the primary or secondary conveyor may be belt or chain-type conveyors, or they may comprise other conveyance means as are known and applied in the particulate materials handling arts. The gates and openings may be replaced or supplemented with alternative metering means to control release. For example, selected metering wheels, augers, or mixers may be incorporated as appropriate for particular materials applications.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is:

1. A material spreader comprising:
   a first means for containing comprising a first means for containing front wall, a first bottom portion and a first means for containing first side wall;
   a second means for containing, said second means for containing having a second means for containing front wall, a second bottom portion, and a second means for containing first side wall;
   means for moving material from said first means for containing;
   means for moving material from said second means for containing;
   said means for moving material from said second means for containing, in combination with said second means for containing, are configured for moving material at variable rates, including a rate different from said means for moving material from said first means for containing;
   wherein said second means for containing is substantially disposed within an interior portion of said first means for containing;
   wherein said first means for containing front wall is entirely separate and distinct from said second means for containing front wall, and said first means for containing side wall is entirely separate and distinct from at least a portion of said second means for containing first side wall;
   wherein said second bottom portion is disposed above said first bottom portion, and at least a portion of said second means for containing is entirely removable from said first means for containing; and
   means for spreading material which is moved by said means for moving material from said first means for containing and said means for moving material from said second means for containing.

2. A material spreader of claim 1 wherein said first means for containing and said second means for containing are hopper-type bins having a portion thereof with a substantially "V"-shaped cross-section.

3. A material spreader of claim 1 wherein said second means for containing is removable as a single unit from said first means for containing.

4. A material spreader comprising:
   a first means for containing comprising a first means for containing front wall, a first bottom portion and a first means for containing first side wall;

a second means for containing, said second means for containing having a second means for containing front wall, a second bottom portion, and a second means for containing first side wall;

means for moving material from said first means for containing;

means for moving material from said second means for containing;

said means for moving material from said second means for containing, in combination with said second means for containing, are configured for moving material at variable rates, including a rate different from said means for moving material from said first means for containing;

wherein said second means for containing is, at least in part, disposed within an interior portion of said first means for containing;

wherein said first means for containing front wall is entirely separate and distinct from said second means for containing front wall, and said first means for containing side wall is entirely separate and distinct from at least a portion of said second means for containing first side wall;

wherein said second bottom portion is disposed above said first bottom portion, and at least a portion of said second means for containing is entirely removable from said first means for containing;

means for spreading material which is moved by said means for moving material from said first means for containing and said means for moving material from said second means for containing; and wherein said first means for containing has a removable first end wall opposing said first means for containing front wall.

5. A material spreader comprising:

a first means for containing comprising a first means for containing front wall, a first bottom portion and a first means for containing first side wall;

a second means for containing, said second means for containing having a second means for containing front wall, a second bottom portion, and a second means for containing first side wall;

means for moving material from said first means for containing;

means for moving material from said second means for containing;

said means for moving material from said second means for containing, in combination with said second means for containing, are configured for moving material at variable rates, including a rate different from said means for moving material from said first means for containing;

wherein said second means for containing is, at least in part, disposed within an interior portion of said first means for containing;

wherein said first means for containing front wall is entirely separate and distinct from said second means for containing front wall, and said first means for containing side wall is entirely separate and distinct from at least a portion of said second means for containing first side wall;

wherein said second bottom portion is disposed above said first bottom portion, and at least a portion of said second means for containing is entirely removable from said first means for containing;

means for spreading material which is moved by said means for moving material from said first means for containing and said means for moving material from said second means for containing;

wherein said means for moving material from said first means for containing is a first conveyor; and wherein said means for moving material from said second means for containing is a second conveyor disposed above said first conveyor.

6. A material spreader of claim 5 wherein said second means for containing is removable as a single unit from said first means for containing.

7. A material spreader of claim 6 wherein that means for containing and said second means for containing each are hopper-type bins each having a portion thereof with a substantially "V"-shaped cross-section.

8. A material spreader of claim 7 wherein said first conveyor is centered below a lowest point of said substantially "V"-shaped cross-section of said first means for containing, and said first means for containing bottom portion is an opening extending along a longitudinal axis of said first means for containing.

9. A material spreader of claim 8 wherein said second conveyor is disposed above said first conveyor and is configured to carry material in a direction parallel to said longitudinal axis of said first means for containing;

and further comprising a wheeled frame coupled to said first means for containing.

10. A material spreader of claim 2 wherein said means for moving material from said second means for containing is an auger.

11. A material spreader of claim 2 wherein said means for spreading is a pneumatic apparatus.

12. A method of spreading material comprising the steps of:

providing a first bin containing, a first material;

providing a first conveyor below said first bin for moving said first material;

providing a removable end wall on said first bin;

operating said first conveyor and causing said first material to be dispersed;

removing said removable end wall;

inserting, into a portion of said first bin, a complete second bin configured for retaining a second material therein, and second conveyor coupled thereto for moving said second material;

operating said second conveyor; and simultaneously operating said first conveyor and moving said first material and thereby simultaneously allowing delivery of both said first material and said second material.

13. A method of claim 12 further comprising the steps of:

providing a means for spreading;

changing a mixture characteristic of combined material being dispersed by said means for spreading, by changing relative speeds between said first conveyor and said second conveyor.

14. A method of claim 13 further comprising the step of changing said mixture characteristic as a function of a geographic location.

15. A method of claim 14 wherein said geographic location is determined by a latitude and longitude of said geographic location.

16. An apparatus comprising:

first means for containing a first material where said first material is loaded through an opening in a top section and dispensed through an opening in a bottom section to a first conveyor;

second means for containing a second material separate from said first material, such that said second means for containing is disposed substantially within said first means for containing;

said second means for containing coupled to a second means for moving said second material;

said second means for containing being configured to be removable from said first means for containing a first material; and whereby said first conveyor and said second means for moving said second material cooperate to provide for an output mixture, with variable composition, via differences in relative output rates of said first conveyor and said second means for moving.

17. An apparatus comprising:

first means for containing a first material where said first material is loaded through an opening in a top section and dispensed through an opening in a bottom section to a first conveyor;

second means for containing a second material separate from said first material such that said second means for containing is disposed substantially within said first means for containing;

said second means for containing coupled to a second means for moving said second material;

said second means for containing being configured to be removable from said first means for containing a first material;

whereby said first conveyor and said second means for moving said second material cooperate to provide for an output mixture, with variable composition, via differences in relative output rates of said first conveyor and said second means for means for dispersing said output mixture;

said first means for containing is a first hopper having a portion thereof with a substantially "V"-shaped cross-section, the first hopper further being configured to receive a removable rear end wall;

said second means for containing is a second hopper, where said second hopper is sized and configured to be nested within said first hopper at a rear end of said first hopper when said second means for moving is coupled to said second hopper and said removable rear end wall is absent; and wherein said second means for moving said second material and said second means for containing are removable from said first means for containing as a single unit.

18. An apparatus of claim 17 further comprising:

means for operating said first conveyor and said second means for moving so as to permit independently variable output rates; and wherein said second means for moving is an auger.

19. A material spreader comprising:

a frame having a plurality of wheels thereon;

a first hopper bin coupled to said frame, said first hopper bin being substantially "V"-shaped and having an open top configured to receive material being loaded into said first hopper bin; said first hopper bin having a substantially planar front end and a pair of side walls having a differential separation therebetween;

said first hopper bin having a structure therein configured for receiving a removable rear end wall which is opposing said substantially planar front end;

a first conveyor, disposed beneath said first hopper bin, said first conveyor sized and configured to transport material exiting from a first bottom portion of said first hopper bin, said first conveyor transporting material along a longitudinal axis of said first hopper bin, in a direction orthogonal to and away from said substantially planar front end;

a second hopper bin disposed, at least in part, within said first hopper bin, said second hopper bin being substantially "V"-shaped and having an open top configured to receive material being loaded into said second hopper bin;

a second conveyor, disposed beneath said second hopper bin, said second conveyor sized and configured to transport material exiting from a second bottom portion of said second hopper bin, said second conveyor transporting material along a longitudinal axis of said first hopper bin, in a direction orthogonal to and away from said substantially planar front end;

said second hopper bin and said second conveyor being configured so as to be removable, as a single combined unit, from said first hopper bin;

means for driving said first conveyor and said second conveyor at independently variable rates;

means for controlling a volumetric characteristic of material being transported by said second conveyor on a per-rotation basis of said second conveyor, and spinning means for dispersing material carried by said first conveyor and said second conveyor.

20. A multi-bin container comprising:

a mobile wheeled frame;

a first means for containing a first material having a first conveyor, said first means for containing coupled to said mobile wheeled frame;

a removable second means for containing a second material having a second endless belt-type conveyor; said second means for containing being positioned and configured to be transported by said mobile wheeled frame; and said first conveyor and said second endless belt-type conveyor being configured so as to first mix said first material and said second material after said first material has departed from said first conveyor and after said second material has departed from said second endless belt-type conveyor.

21. A multi-bin container of claim 20 further comprising:

a means for spreading material, said means for spreading coupled to said mobile wheeled frame.

22. A multi-bin container of claim 21 wherein said means for spreading material comprises a plurality of spinners.

23. A multi-bin container of claim 21 wherein each of said plurality of spinners is positioned and configured to spread both said first material and said second material.

24. A multi-bin container comprising:

a mobile wheeled frame;

a first means for containing a first material having a first conveyor, said first means for containing coupled to said mobile wheeled frame;

a second means for containing a second material having a second conveyor;

said second means for containing being positioned and configured to be transported by said mobile wheeled frame;

said first conveyor and said second conveyor being configured so as to first mix said first material and said second material after said first material has departed from said first conveyor and after said second material has departed from said second conveyor;

a means for spreading material, said means for spreading coupled to said mobile wheeled frame;

wherein said means for spreading material comprises a plurality of spinners;

wherein each of said plurality of spinners is positioned and configured to spread both said first material and said second material: and wherein said first conveyor and said second conveyor are configured to be independently operated at differing material delivery rates in response to a position determination made by a GPS receiver.

25. A system for applying material to a surface of a roadway comprising:

a truck;

a first bin, on said truck, and a first means for moving a first material from said first bin;

a second bin, on said truck, and a second means for moving a second material from said second bin;

means for determining a position of said truck;

a database containing information relating to a type of preferred material to be applied to a roadway at a predetermined location;

means for spreading material on said roadway; and wherein an application rate of material spread by said means for spreading is controlled in response to a comparison of said position of said truck to said database.

26. A system of claim 25 wherein said database includes information relating to a preferred de-icing material to be applied to a predetermined location of a bridge.

27. A system of claim 26 wherein said first bin contains road salt and said second bin contains Calcium Magnesium Acetate.

28. A system of claim 25 wherein said application rate of material is further responsive to an attitude characteristic of said truck.

29. A system of claim 26 wherein said means for determining a position of said truck is a global positioning system receiver.

30. A system of claim 29 wherein said second bin and said second means for moving a second material are coupled into a combination which is removable, as a single unit, from a nested position within said first bin.

31. A system of claim 30 wherein:

said first means for moving is not configured to simultaneously carry said first material which has been moved from said first bin and said second material which has been moved from said second bin; and said second means for moving is not configured to simultaneously carry said first material which has been moved from said first bin and said second material which has been moved from said second bin.

32. A system of claim 31 wherein said first means for moving and said second means for moving are conveyors disposed in a vertically stacked configuration.

33. A system of claim 32 wherein said first means for moving is below said second means for moving and said first means for moving does not extend longitudinally beyond an end point of said second means for moving.

34. A method of spreading material comprising the steps of:

providing a wheeled vehicle, having a front end and a rear end;

providing, on said wheeled vehicle, a plurality of first bin walls configured for assisting in containing a first particulate material;

providing a first conveyor located below said first particulate material and coupled to at least one of said plurality of first bin walls;

operating said first conveyor and causing said first particulate material to be moved;

causing a plurality of truncated second bin side wall members to assist the plurality of first bin walls in retaining a second particulate material, above a second conveyor and above a lower portion of said plurality of first bin walls;

operating said second conveyor; and simultaneously operating said first conveyor end moving said first particulate material and thereby simultaneously allowing delivery of both said first particulate material and said second particulate material.

35. A method of claim 34 further comprising the steps of:

providing a means for dispersing matter;

changing a mixture characteristic of combined material being dispersed by said means for dispersing, by changing relative speeds between said first conveyor and said second conveyor, and wherein said plurality of truncated second bin side wall members are rigidly coupled to said second conveyor.

36. A method of claim 35 further comprising the step of removing a removable end first bin wall prior to insertion of said plurality of second bin walls.

37. A particulate matter spreading apparatus comprising:

a vehicle frame having a first end and a second end;

a first end wall, an opposing second end wall, and two side walls extending from said first end wall to said second end wall;

a first container having a first volume characteristic and a second container having a second volume characteristic;

said first container and said second container disposed on said vehicle frame in a linear configuration where one of said first container and said second container is disposed in closer proximity to said first end of said vehicle frame;

a removable wall disposed between and separating said first container from said second container;

said first container being defined in part by said first end wall and said removable wall;

said second container being defined in part by said removable wall and said second end wall;

first means for moving particulate matter;

said first means for moving particulate matter is configured to move particulate matter from said first container;

second means for moving particulate matter;

said second means for moving particulate matter is configured to move particulate matter from said second container;

means to disperse particulate matter from said first means for moving and said second means for moving; and said second means for moving particulate matter is detachably disposed with respect to said vehicle frame and said first means for moving particulate matter; so that a unified container, having a volume characteristic larger than the combination of said first volume characteristic and said second volume characteristic, can be created by removing said removable wall and said second means for moving particulate matter.

38. An apparatus of claim 37 wherein said second means for moving particulate matter is capable of delivering particulate matter at variable rates which are independent of a rate of delivery of particulate matter by said first means for moving.

39. An apparatus of claim 38 wherein said second means for moving is an endless belt-type conveyor.

40. An apparatus for spreading matter comprising:
a vehicle frame;
a front bin coupled to said vehicle frame;
a lower conveyor disposed below the front bin, said lower conveyor configured to wove material from said front bin;
a rear bin;
an upper conveyor detachably disposed above said lower conveyor and disposed below said rear bin, said upper conveyor configured to move material from said rear bin;
means for dispersing particulate matter delivered by said lower conveyor and said upper conveyor; and
a removable wall forming a rear wall of said front bin and a front wall of said rear bin;
said removable wall being configured so that removal of said removable wall and said upper conveyor thereby creates a unified space for containing material, which unified space is larger than a combination of said front bin and said rear bin.

41. An apparatus of claim 40 wherein said rear bin utilizes portions of side walls of said unified space.

42. An apparatus of claim 41 wherein said rear bin comprises a plurality of truncated side wall members disposed above said upper conveyor and spanning a distance from said upper conveyor to said portions of side walls of said unified space.

43. A method of converting a single bin spreader vehicle to a multi-bin spreader vehicle, comprising the steps of:
providing a vehicle having a first elongated hopper bin with a front end, a rear end, and a right side wall and a left side wall, and a first elongated endless belt-type conveyor disposed underneath the first elongated hopper bin;
the vehicle further having a spinner configured to disperse particulate matter being carried by the first elongated endless belt-type conveyor from the first elongated hopper bin;
causing the first elongated hopper bin to be divided into a front bin and a rear bin, by causing a removable wall, placed at an intermediate location between the front end and the rear end, to span between the right side wait and the left side wall; and
causing the rear bin to be separate from the first elongated endless belt-type conveyor by:
causing a right truncated side wall member to span a distance from a rear endless belt-type conveyor to the right side wall and a left truncated side wall member to span a distance from the rear endless belt-type conveyor to the left side wall;
where the rear endless belt-type conveyor is a detachably disposed above a rear portion of the first elongated endless belt-type conveyor.

44. A multi-bin container comprising:
a mobile wheeled frame;
a first means for containing a first material, said first means for containing comprising a first conveyor, said first means for containing coupled to said mobile wheeled frame;
a removable second means for containing a second material having a second conveyor, said second means for containing being positioned and configured to be transported by said mobile wheeled frame;
said first conveyor and said second conveyor being configured so as to first mix said first material and said second material after said first material has departed from said first conveyor and after said second material has departed from said second conveyor; and
said removable second means for containing being sized, disposed and configured such that removal of said removable second means for containing results in an increase in available space for containing said first material on said mobile wheeled frame.

* * * * *

UNITED STATES PATENT AND TRADEMARK OFFICE
CERTIFICATE OF CORRECTION

PATENT NO. : 6,817,551 B2
DATED : November 16, 2004
INVENTOR(S) : John Williams and Gerald Brechon It is certified that error appears in the above-identified patent and that said Letters Patent is hereby corrected as shown below:

Column 12,
Line 13, please delete the word "that" and insert therefor -- first --.
Line 36, please delete the comma after the word "containing".

Column 13,
Line 35, after the phrase "and said second means for", please insert -- moving; --.
Line 35, please insert a new paragraph before the second instance of the word "means". The paragraph should read: -- means for dispersing said output mixture; --.

Column 14,
Line 51, please delete "21" and insert therefor -- 22 --.

Column 17,
Line 15, please remove the word "wove" and insert therefor -- move --.

Column 18,
Line 8, please remove the word "wait" and insert therefor -- wall --.

Signed and Sealed this

Nineteenth Day of April, 2005

JON W. DUDAS
*Director of the United States Patent and Trademark Office*